United States Patent
Thibault et al.

(10) Patent No.: US 11,809,570 B2
(45) Date of Patent: Nov. 7, 2023

(54) METHOD AND APPARATUS FOR ANALYZING SIDE CHANNEL-RELATED SECURITY VULNERABILITIES IN DIGITAL DEVICES

(71) Applicant: NEWAE TECHNOLOGY INC, Halifax (CA)

(72) Inventors: Jean-Pierre Thibault, Ottawa (CA); Colin Patrick O'Flynn, Halifax (CA)

(73) Assignee: Newae Technology Inc, Halifax (CA)

(*) Notice: Subject to any disclaimer, the term of this patent is extended or adjusted under 35 U.S.C. 154(b) by 170 days.

(21) Appl. No.: 17/064,326

(22) Filed: Oct. 6, 2020

(65) Prior Publication Data
US 2022/0108021 A1 Apr. 7, 2022

(51) Int. Cl.
*G06F 21/57* (2013.01)
*G06F 11/36* (2006.01)

(52) U.S. Cl.
CPC .......... *G06F 21/577* (2013.01); *G06F 11/366* (2013.01); *G06F 2221/034* (2013.01)

(58) Field of Classification Search
CPC ................. G06F 21/577; G06F 11/366; G06F 2221/034; G06F 21/556; G06F 21/554
See application file for complete search history.

(56) References Cited

U.S. PATENT DOCUMENTS

| | | | | |
|---|---|---|---|---|
| 2007/0263649 A1* | 11/2007 | Cuni | ........ | H04L 43/00 370/252 |
| 2008/0091975 A1* | 4/2008 | Kladko | ........ | G06F 11/277 714/25 |
| 2010/0281304 A1* | 11/2010 | Moyer | ........ | G06F 11/3648 714/37 |
| 2014/0075203 A1* | 3/2014 | Barbu | ........ | G06F 21/577 713/189 |
| 2016/0140340 A1* | 5/2016 | Walters | ........ | G06F 21/556 726/22 |
| 2018/0365195 A1* | 12/2018 | Rioul | ........ | H04L 9/002 |
| 2019/0258805 A1* | 8/2019 | Elovici | ........ | G06F 11/261 |
| 2020/0300912 A1* | 9/2020 | Armagost | ........ | G01R 31/31905 |
| 2021/0025938 A1* | 1/2021 | Pöppe | ........ | G01R 31/31905 |
| 2021/0359508 A1* | 11/2021 | Nelms | ........ | G06F 13/1657 |

* cited by examiner

*Primary Examiner* — Meng Li
(74) *Attorney, Agent, or Firm* — Lathrop GPM LLP; Ricardo Ochoa; Robert J. Lambrechts

(57) ABSTRACT

A method and apparatus for analyzing side-channel security vulnerabilities in a digital device. A first time sequence of measurements of side-channel related phenomena of the digital device, such as power draw or electromagnetic emissions is obtained. A second time sequence of debug outputs of the digital device, such as program counter contents or other device processor or register states, is obtained. The first time sequence and the second time sequence are obtained based on a common time reference, and thus correlated in time. A controller can provide a common timing signal to measurement equipment obtaining the first time sequence and to a debug tool obtaining the second time sequence, and the common time reference can be correspond to the common timing signal.

19 Claims, 10 Drawing Sheets

METHOD AND APPARATUS FOR ANALYZING SIDE CHANNEL-RELATED SECURITY VULNERABILITIES IN DIGITAL DEVICES

FIELD OF THE INVENTION

The present invention pertains generally to the field of computer security and in particular to analyzing and guarding against potential side-channel attacks against digital devices such as microcontrollers and computing devices.

BACKGROUND OF THE INVENTION

Secure digital systems may be compromised by many methods. One method that is of particular concern is known as side-channel attacks. In a side-channel attack, a digital device leaks secret information out of a "side channel", which is then observed and analyzed. Examples of side channels include the power consumed by the digital device during execution of a program flow or data processing, or the execution time of an algorithm related to the program flow or data being processed.

Methods of testing against side-channel attacks are known and form part of industry-recognized security standards. For example, Common Criteria (CC) testing specifies several levels of security, some of which require testing against timing and power side-channels. The FIPS 140-3 test standard also specifies methods to test for timing and power side-channel vulnerabilities, which are based on the international standard ISO/IEC 17825.

The typical results of these tests provide information about a level of side-channel leakage. This is often presented in the form of a data plot, with time (or sample number) as the X axis, for example as illustrated in FIG. 3. While such test results can provide for a simple pass/fail test result, it can be difficult to determine the root cause of a failure.

Hardware-based cryptographic or secure solutions may have constant execution time. This makes it simpler, based on a timing analysis such as illustrated in FIG. 3, to determine the specific operation causing a failure. However, this is more difficult with software-based systems. In software-based systems, the execution of the operations of interest may be interrupted by other less relevant operations. For example, a sequence of cryptographic operations may be interrupted by a real-time operating system. In this case, the execution of the operations of interest does not necessarily occur consistently in time, with the same instructions being executed in the same time-steps. Therefore, it is more difficult to determine the source of a security failure.

The variable timing of instruction execution, particularly in software-based systems, also makes detection of timing side-channels more difficult. An algorithm can be considered to run in constant time if it takes the same amount of time to execute the algorithm for different input data. This simple example ignores the fact that, for timing side-channels, the information of interest is a time difference that is dependent on the data itself, not only different (non-constant) execution times for different runs of the same algorithm.

The core algorithm may be constant time, but it may be interrupted by unrelated processing. This unrelated processing does not necessarily indicate a security threat, but instead appears as random noise in the time measurement. Thus an evaluator of security vulnerabilities must spend considerable time determining whether there is some hidden data-dependent time flow, which may not be immediately obvious due to the noise of the random interruptions.

Tooling and technology exists for use by development teams in understanding how a device operates. This technology typically includes or takes the form of software simulators, which are capable of simulating instruction execution; emulators, which run the software on a similar (but not exactly the same as final) hardware; and debug logic, which interfaces to the actual hardware to report the code execution and program flow.

The debug logic often runs over a standard interface, such as the Joint Test Action Group (JTAG) port. This logic allows an attached debugger to perform steps such as stopping the main microcontroller for executing code, executing single instructions at a time, viewing or changing memory, and viewing or changing the contents of registers.

Another form of debug logic uses an 'instruction trace', which outputs, to a 'trace port,' information on the current state of the processor. This information is sent in real-time; such that the output at the trace port at each particular time closely corresponds to what the processor itself is performing (in terms of instruction execution) at that time. This trace information may be available in other forms such as outputs by the standard JTAG port, or other internal ports. This trace information differs from the other debug controls, as the trace information is sent without changing the microprocessor control flow. The trace information may include internal time-stamps, which may be used to determine when certain code executed. This can be used to generate information such as confirmations that all code branches have been tested, or measurements of the percentage of time the processor is spending performing certain functions.

However, despite the availability of debug information and prescribed tests for measuring side-channel leakage characteristics, it is still difficult to determine the root cause of unacceptably high side-channel leakage events leading to security test failures. Therefore, there is a need for a method and apparatus for analyzing side-channel related security vulnerabilities in digital devices that obviates or mitigates one or more limitations in the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

Embodiments of the present invention provide for a method and apparatus for analyzing side-channel related security vulnerabilities in digital devices. In various embodiments, this involves tagging the specific code being executed by a microcontroller that is causing a side-channel analysis leakage. Embodiments of the present invention utilize widely available standard debugging interfaces, which provide information about code execution that is used for debugging and development of microcontrollers.

According to various embodiments, both debug output and probe measurements are acquired in a synchronized manner. The debug output may be indicative of a sequence of instructions being executed by a digital device, along with the times at which each of the sequence of instructions is performed. The probe measurements are indicative of side-channel information (also referred to as side-channel leakage characteristics) observable by the digital device, such as power draw fluctuations or electromagnetic output. The probe measurements comprise a sequence of measurements along with the times of such measurements. The times of the debug outputs and the times of the probe measurements may be synchronized, so that each particular probe measurement can be cross-referenced with a corresponding debug output. A debug tool which obtains the debug outputs and measurement equipment which obtains the probe measurements may both be operatively coupled to a controller. The controller synchronizes operation of both the debug tool and the measurement equipment in time. The synchronization may involve providing a common clock signal to both the debug tool and the measurement equipment. The common clock signal may be used for example to timestamp multiple successive debug outputs and probe measurements, respectively.

Embodiments of the present invention provide for an apparatus for analyzing side-channel related security vulnerabilities in a digital device. The apparatus includes at least measurement equipment (such as an oscilloscope and probe), a debug tool which interfaces with a debug port of the digital device, and a controller. The measurement equipment is configured to obtain a sequence of measurements of a side-channel leakage characteristic of the digital device. The debug tool is configured to obtain a sequence of debug outputs from the digital device. The controller is operatively coupled to both the measurement equipment and the debug tool and configured to correlate, in time, the sequence of measurements with the sequence of debug outputs.

In some embodiments, the controller is configured to generate and provide a common timing signal to both the measurement equipment and the debug tool. The debug tool is configured to time stamp plural debug outputs belonging to the sequence of debug outputs based on the common timing signal. The measurement tool is configured to acquire plural measurements of the sequence of measurements based on the common timing signal.

In some embodiments, correlating the sequence of measurements with the sequence of debug outputs includes processing the sequence of measurements into first time series data, processing the sequence of debug outputs into second time series data, and providing both the first time series data and the second time series data as data points indexed using a common time reference.

In some embodiments, the controller is further configured to generate and provide a common timing signal to both the measurement equipment and the debug tool. The measurement equipment and the debug tool are configured to operate based on the common timing signal, and the common time reference is synchronized with the common timing signal.

In some embodiments, the side-channel leakage characteristic includes a measurement of power consumed by the digital device under test. In some embodiments, the side-channel leakage characteristic includes a measurement of electromagnetic emissions of the digital device under test. In some embodiments, the side-channel leakage characteristic includes a measurement of execution time of an algorithm being executed by the digital device under test.

In some embodiments, the controller is further configured to generate a trigger signal upon observation of a predetermined pattern in the sequence of debug outputs. The trigger signal is transmitted to the measurement equipment. The measurement equipment configured to obtain a measurement in response to receipt of the trigger signal.

Embodiments of the present invention provide for a method for analyzing side-channel related security vulnerabilities. The method includes obtaining, by measurement equipment, a sequence of measurements of a side-channel leakage characteristic of a digital device under test. The method includes obtaining, by a debug tool, a sequence of debug outputs from the digital device. The method includes controlling, by a controller, operation of the measurement equipment probe and the debug tool, said controlling comprising correlating, in time, the sequence of measurements with the sequence of debug outputs. The method may further include one or more operations commensurate with the above-described operations of the controller.

Embodiments of the present invention provide for a computer program product comprising a non-transitory computer readable medium having statements and instructions stored thereon that, when executed by one or more processors, cause an apparatus associated with the one or more processors to implement one or more methods described above or elsewhere herein.

Embodiments of the present invention provide for a method for analyzing side-channel related security vulnerabilities. The method includes obtaining, by a debug tool, a sequence of debug outputs from a digital device under test. The method includes monitoring, by a controller or by the debug tool, for a predetermined pattern in the sequence of debug outputs. The method includes, in response to detecting the predetermined pattern, triggering, by the controller or by the debug tool, measurement equipment to obtain one or more measurements of a side-channel leakage characteristic of the digital device. In some embodiments, the method further includes correlating, in time, the one or more measurements with the sequence of debug outputs. The method further includes controlling, by the controller, operation of the measurement equipment probe and the debug tool. The controlling includes correlating, in time, the sequence of measurements with the sequence of debug outputs. Embodiments of the present invention provide for an apparatus configured to perform this method. For example, the apparatus can include the controller and the debug tool, and optionally also the measurement equipment.

Compared to the state of the art, embodiments of the present invention potentially provide for several advantages which can be realized during design and evaluation of digital devices. The measurement of internal state that represents the side-channel power analysis leakages is associated with specific information about the state of internal digital systems retrieved from the debug interface. The state of the art is to use simple triggers at an initial point in time, which does not allow tracking of the code flow if the code flow changes during execution.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

Code that is executed on a digital device may be processing secure information. An example of such a code is the Advanced Encryption Standard (AES), as specified by FIPS 197. This algorithm is designed to encrypt data based on a secret key. The algorithm is designed such that even knowing the input and output of the algorithm, the secret key cannot be recovered. Thus an attacker with knowledge of the input and output cannot recover the secret key. If an attacker recovered the secret key, they could decrypt or encrypt other data transmitted with the same key.

Figure 1:
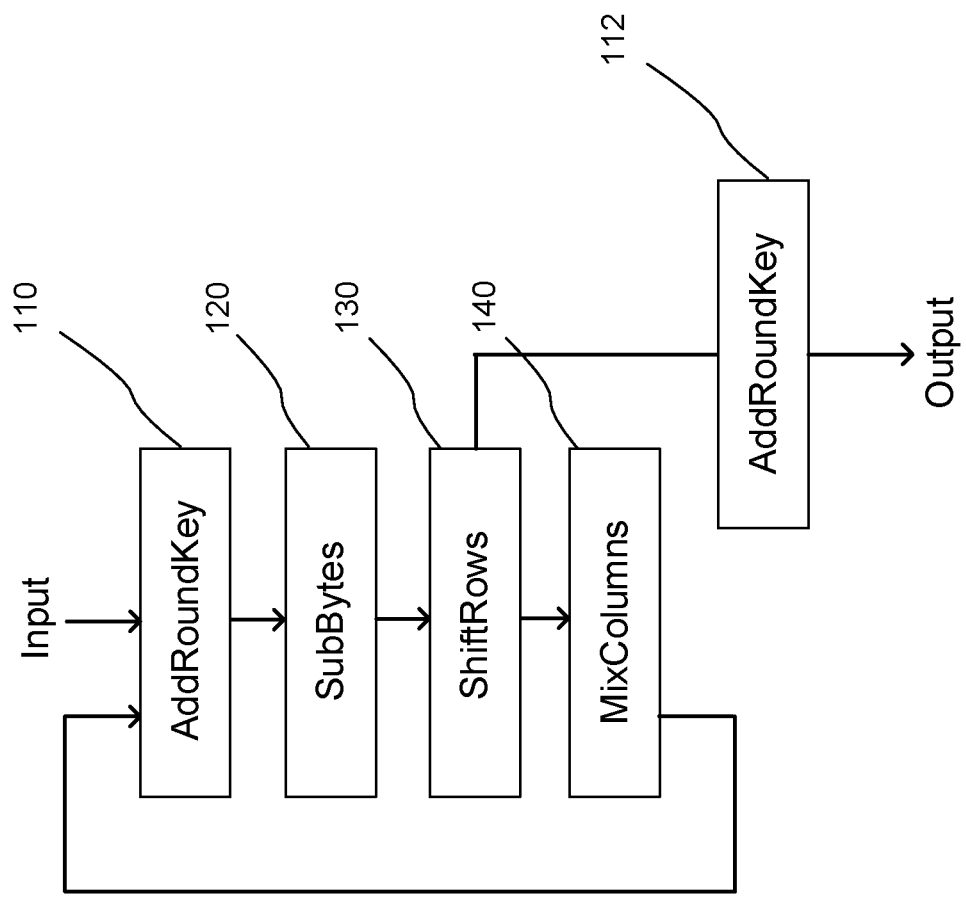
FIG. 1 illustrates an example of an advanced encryption standard (AES) code, according to the prior art.

An example of part of the AES algorithm is shown in FIG. 1. This algorithm involves several steps that are performed on some input data. These steps are called AddRoundKey 110, SubBytes 120, ShiftRows 130, and MixColumns 140. Another instance of AddRoundKey 112 occurs on the output of ShiftRows 130 prior to providing the output of the AES algorithm. Various modifications or alternative representations of the illustrated AES algorithm can also be used as would be readily understood by a worker skilled in the art. Each step adds various cryptographic properties that were previously described in detail in FIPS 197.

In order to attempt recovery of the secret key, an attacker may obtain and use side-channel power analysis information. As the code is executing on a digital device, some information about the internal data being manipulated can be measured by observing externally measurable characteristics of the digital device. Such characteristics can include the time-variation in power being drawn by the digital device, or the time-variation in electromagnetic emissions of the digital device. Examples of such a side channel were disclosed by Paul Kocher et al. in the paper "Differential Power Analysis" (P. Kocher, J. Jaffe, Differential Power Analysis, technical report, 1998; later published in Advances in Cryptology—Crypto 99 Proceedings, Lecture Notes in Computer Science Vol. 1666, M. Wiener, ed., Springer-Verlag, 1999, (online on 2020-09-14 at: https://www.paulkocher.com/doc/DifferentialPowerAnalysis.pdf), where the power used by the digital device is the side channel.

Typically, side-channel leakage occurs due to various operations being performed on the known and secret data (e.g. the secret key). The specific operations may not be obvious just by analyzing the program flow or algorithm. The original algorithm is converted into computer code. The computer code is then executed by a digital device. During the execution by this digital device, time variations in power draw (or other observable side-channel leakage characteristics) will typically occur based on the data being processed.

Figure 2:
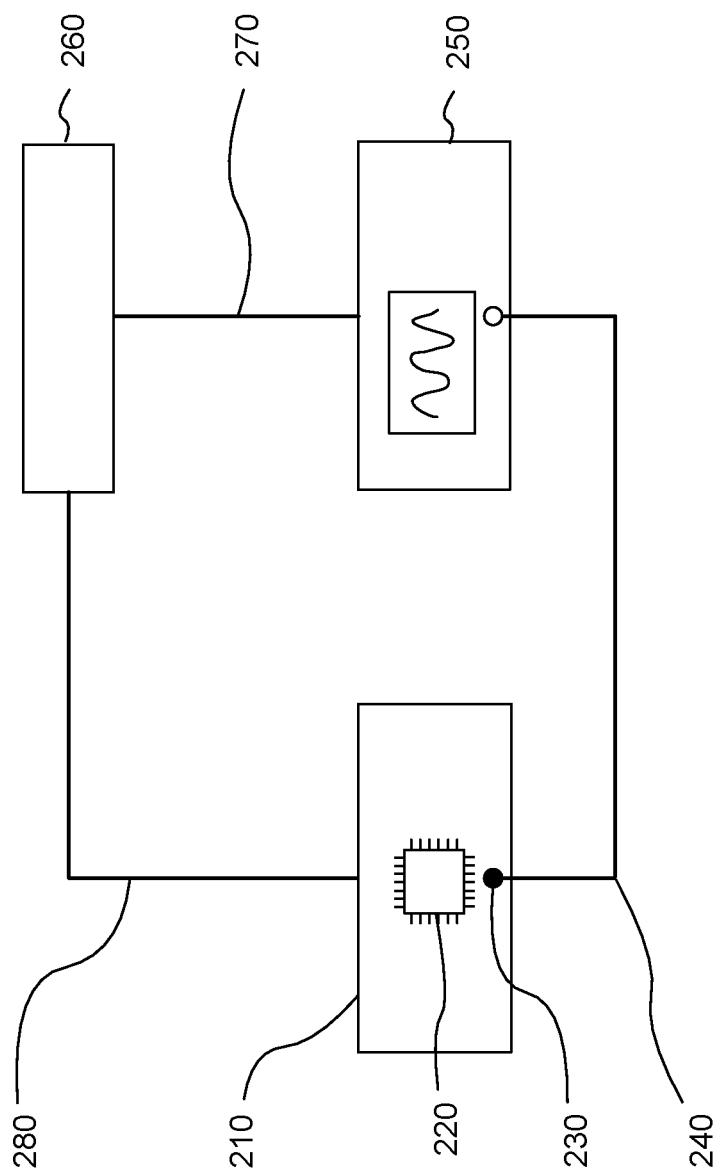
FIG. 2 illustrates a side channel analysis setup according to the prior art.

In order to evaluate security of the digital device against side-channel based attacks, a side channel analysis evaluation may be performed. A typical evaluation setup is shown in FIG. 2. In this setup, a target system 210 integrates a digital device 220 which is executing a security algorithm. The digital device 220 is controlled by a control computer 260, which performs the security evaluation. Examples of such an evaluation are described in the National Institute of Standards and Technology (NIST) work by G. Goodwil et al., entitled "A testing methodology for side-channel resistance validation" (available online on 2020 Sep. 14 at: https://csrc.nist.gov/csrc/media/events/non-invasive-attack-testing-workshop/documents/08_goodwill.pdf) and the ISO/IEC 17825 specification. The control computer 260 also controls measurement equipment 250 via a control connection 270. The measurement equipment 250 is connected via a test lead 240 to a probe 230 which measures some side channel leakage characteristics of the digital device 220.

As used herein, the term "connection" refers to a communication interface, such as a wired data communication interface, which carries information. The communication can be unidirectional or bidirectional. The interface can convey information in the form of analog waveforms, digital messages, timing signals, or the like, or a combination thereof, using one of a variety of communication protocols as would be readily understood by a worker skilled in the art.

Figure 3:
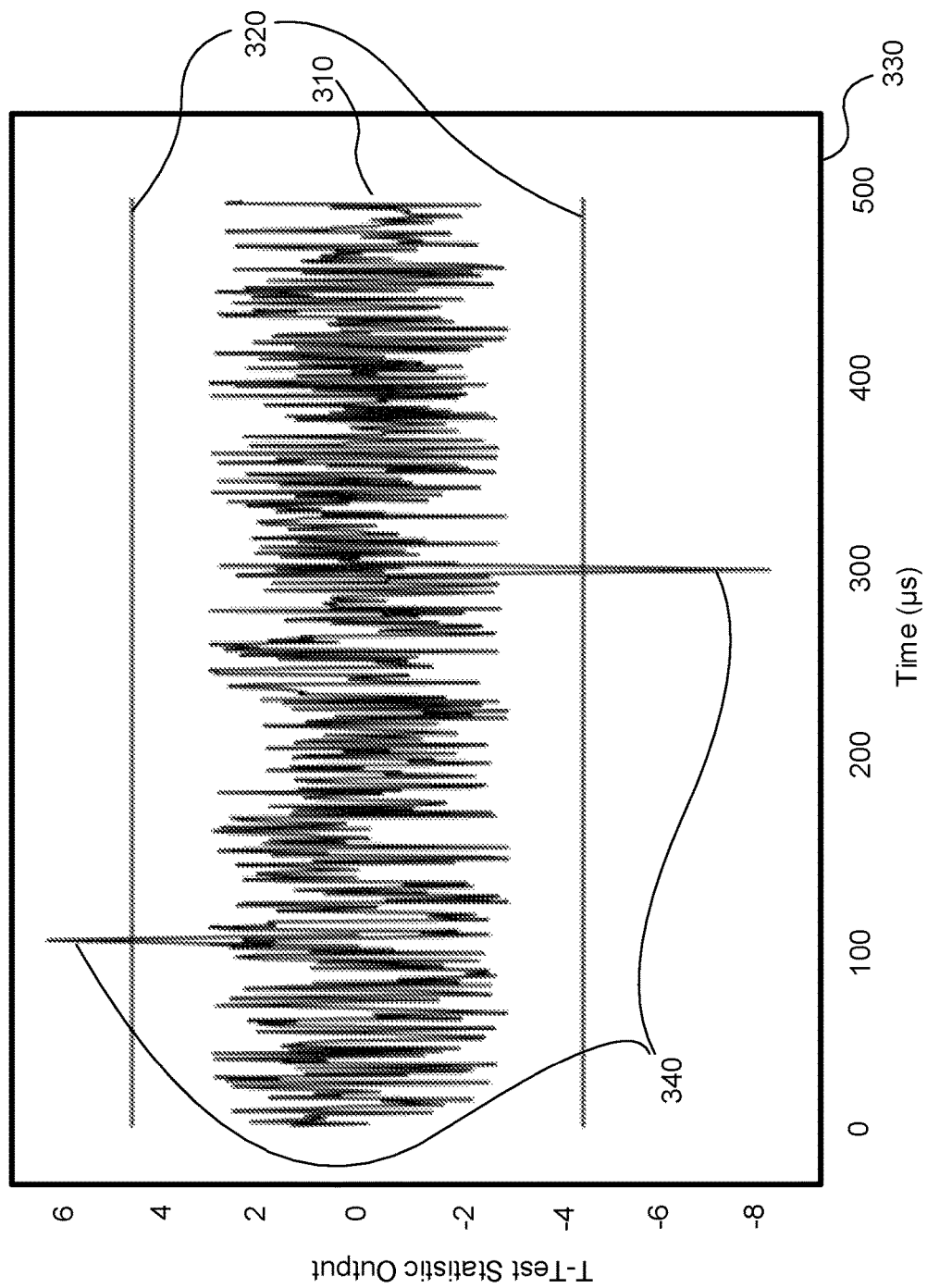
FIG. 3 is a graph of a side channel analysis result graph according to the prior art.

In this operation, the digital device 220 is executing a security algorithm on known data. The known data is known or controlled by the control computer 260. The control computer obtains side-channel information (leakage characteristic), such as the power consumed (drawn) by the digital device, using a combination of probe 230, test lead 240, and measurement equipment 250. Other examples of side channel information which may be measured can include the algorithm execution time on the digital device and electromagnetic emissions made by the digital device during execution of the security algorithm. The control computer can then perform an analysis and generate a graph showing the location of higher side-channel "leakage" over time. FIG. 3 illustrates an example of a resulting graph.

FIG. 3 illustrates a graphical result 310, which is a particular statistic representing the side-channel leakage. In this example the result 310 is known as a T-Test statistic, which is a statistical measurement of the likelihood of a difference between two power traces. Pass or fail range 320 may define the limits of acceptable measurements, with peaks 340 indicating points in time at which excessive amounts of side-channel leakage occurs.

The starting point for the time 330 axis is based on an initial trigger point, which is an arbitrary point defined by the control computer 260 from FIG. 2.

Figure 4:
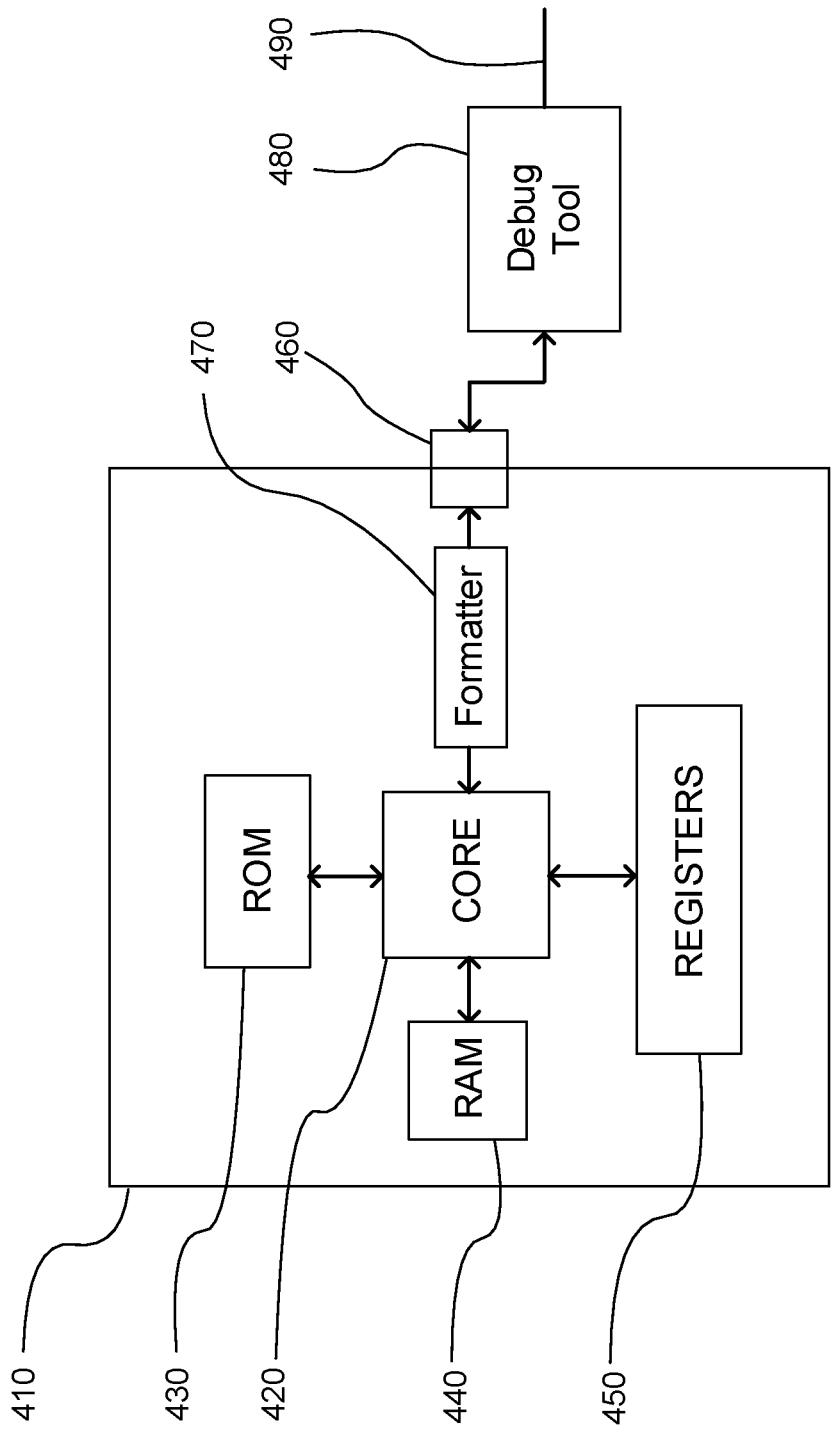
FIG. 4 illustrates an example setup showing debug (or trace) information coming from a computer processor core according to the prior art.

Separately, during development of algorithms such as those implemented in digital device 220, the use of various debugging tools is likely to occur. One of these is known as a debug port. An example of a digital device 410 is shown in FIG. 4. In this case, digital device 410 is a typical microcontroller, which contains a computer processor core 420 that executes instructions, the instructions typically being read from read only memory (ROM) 430. During execution of instructions, the core 420 may use random access memory (RAM) 440 and registers 450 to store intermediate data.

As used herein, the term "debug port" refers to any port via which trace information, debug information, register contents, RAM or ROM contents, program counter contents, or other indications of internal conditions of the digital device under test can be conveyed to an external tool, which is generally referred to herein as a debug tool. Although a trace port may be provided separately from a debug port, the term "debug port" is used herein in a general sense, and may include dedicated trace ports. Debug ports may be a debug access port, JTAG port, or the like. The debug tool can transmit messages to the digital device under test via the debug port or via an associated control access port or other type of port, as would be readily understood by a worker skilled in the art. It is considered that such ports may be omitted or rendered unusable in production copies of the digital device under test.

In order to understand the program flow of executed data, a debug tool 480 may be used. This debug tool 480 has a connection 490 that can be connected to a developer computer. The debug tool 480 also connects to the digital device 410, using a special debug connection 460. In this case an internal electronic device referred to as the debug formatter 470 is responsible for managing communication between the debug tool 480 and the core 420. This may include outputting information indicative of the specific state of the core 420, limiting access to certain memory areas such as ROM 430 and RAM 440, or the like, or a combination thereof.

In order to determine the specific instructions or program flow that results in side-channel analysis leakages, embodiments of the present invention provide a means by which the debug information is analyzed relative to the side-channel information. Furthermore, the debug information may be obtained (and potentially recorded) and processed simultaneously, or the debug information may be recorded and processed at a later time. As this is not the standard usage of the debug (trace) port, this requires integration of both the measurement equipment and debug tool to provide useful information for the analysis.

Figure 5:
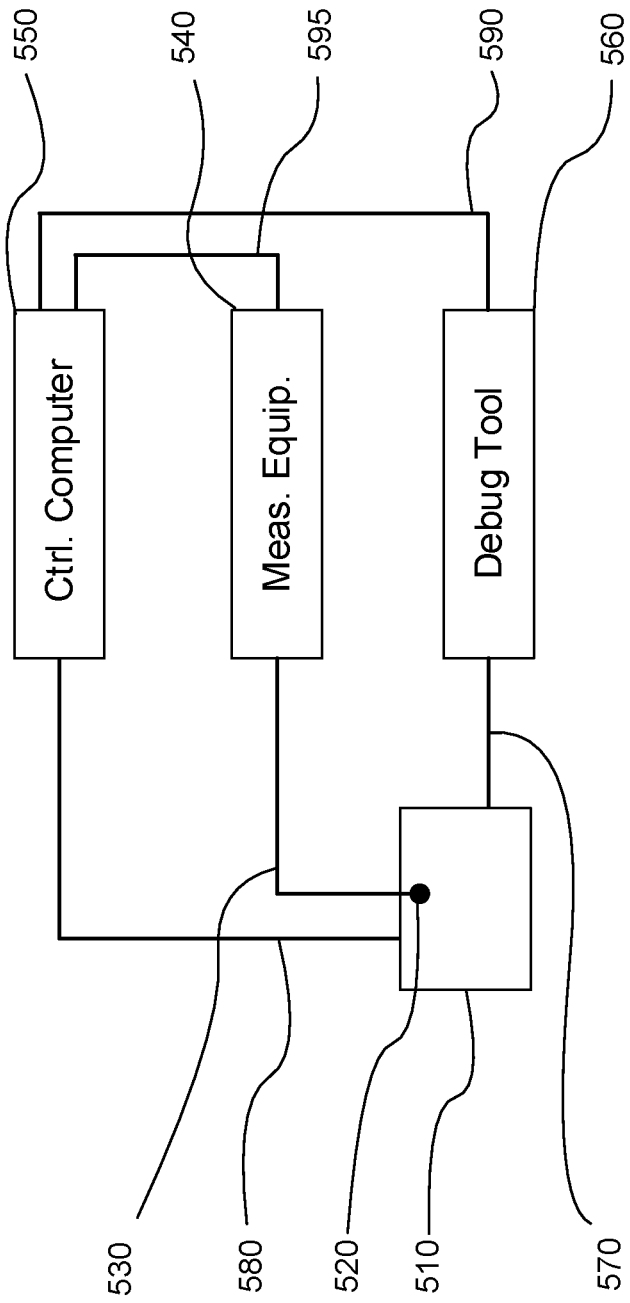
FIG. 5 illustrates side channel measurement equipment synchronously operating in combination with a debug interface, according to an embodiment of the present invention.

An apparatus to accomplish this is detailed in FIG. 5. Here the digital device 510 is again executing the security algorithm, where probe 520 and test lead 530 measure the side-channel information (leakage characteristic). The measurements of side-channel information are obtained using measurement equipment 540 which may include a device such as an oscilloscope, an analog to digital converter (ADC) with analog signal conditioning, or other instrument as appropriate for the specific side-channel characteristic. The measurement equipment 540 is controlled by the control computer 550 using connection 595. This control computer may be for example an embedded circuit board or chip which controls several devices on the same board, or may be a computer controlling multiple physically connected instruments.

The measurement equipment can be operatively coupled to one or more of a variety of probes and thus configured to measure a variety of side-channel leakage characteristics. The measurement equipment can be configured to measure fluctuations in power drawn by the digital device, fluctuations in RF emissions by the digital device, fluctuations in sound emitted by the digital device, or other side-channel leakage characteristics. This is performed by taking a time sequence of measurements, which may be time stamped or otherwise indexed in time. The values, timings, or both values and timings of the measurements as obtained by the measurement equipment can be analyzed. The analysis can be performed by the measurement equipment itself, with the results being passed to the control computer or another device. Alternatively, the raw measurements can be provided by the measurement equipment to the control computer or another device which is configured to perform the analysis. The analysis can include one or a combination of signal processing operations as would be readily understood by a worker skilled in the art, directed toward determining if the side-channel leakage characteristics of the digital device are within an acceptable range. For example, a T-test statistical analysis can be performed on the measurements, as already described above.

The control computer 550 also controls the debug tool 560 using connection 590. This debug tool 560 is connected using a connection 570 to the debug (trace) port of the digital device 510. The debug tool can include electronics configured to communicate with the debug port by receiving messages from the debug port, and optionally by transmitting messages such as instructions or queries. The debug tool is configured to acquire a time sequence of debug outputs, which may be time stamped or otherwise indexed in time. The debug tool can further include memory for storing messages received from the debug port. The control computer can control aspects such as which messages the debug tool transmits and the timing of transmissions. The control computer can provide a timing signal to the debug tool, and the debug tool may be configured to timestamp received messages based on the timing signal. The timing signal may be indicative of a common reference time, which is tracked and used by the control computer, the debug tool, and the measurement equipment.

In some embodiments, messages output by the formatter, as received by the debug tool, can be time stamped by the formatter. In such cases, this time stamp information can be used in place of or along with time stamp information generated by the debug tool. In other embodiments, messages output by the formatter are not time stamped by the formatter, but rather may be time stamped by the debug tool upon receipt. The time stamping provides timing information which can be referenced to determine when the messages were received, relative to other observable quantities such as side-channel measurements provided by the measurement equipment. In some embodiments, an estimate of when a message was generated and output can be determined based on when the message was received by the debug tool, by subtracting a small amount of time indicative of estimated message propagation delays.

In various embodiments, the control computer 550 is configured to record the side-channel measurements from measurement equipment 540, along with information about the specific instructions being executed, as obtained using the debug tool 560. This interconnection requires a stable time reference between the instruments, which may require connection of the clock circuitry between the instruments. This clock connection is facilitated by timing interconnection 595 for the side-channel measurement equipment and by timing interconnection 590 for the debug tool.

The timing interconnection can convey a timing signal. The timing signal may include a simple oscillating signal indicative of clock pulses, where each device connected to the timing interconnection increments its own local counter based on the clock pulses. In this case, devices can synchronize their local counters based on additional messaging. In other embodiments, the timing signal may include count information indicative of the amount of time elapsed since an initial reference time. For example, the timing signal may include an indication of current system time, which is updated at regular intervals, for example on the order of fractions of a second. The count information can be provided with every instance of the timing signal or intermittently. In this case, each device (measurement equipment or debug tool) may or may not maintain its own local counter indicative of current time. Devices maintaining their own counter or clock may be configured to synchronize their counter or clock to the control computer's clock signal periodically or intermittently.

In more detail, the control computer can transmit the same timing signal on both timing interconnection 590 and timing interconnection 595. Actions performed by the side-channel measurement equipment 540 and the debug tool 560 can be driven by these same timing signals and therefore may be synchronized in time. For example, each transmission received by the debug tool can be time stamped with a time which is based on the timing signal received via timing interconnection 590. Each signal acquisition (e.g. ADC output) performed by the measurement equipment can be driven by the timing signal received via timing interconnection 595, and potentially time stamped with a time that is generated based on the timing signal. Accordingly, outputs from the debug tool can be precisely correlated (in time) with corresponding outputs from the measurement equipment. The measurement equipment and debug tool can both receive the timing signal from the control computer. The measurement equipment and debug tool can both time their actions based on the timing signal as received from the control computer. The measurement equipment and debug tool can both timestamp measurements or received debug outputs based on the timing signal as received from the control computer. This may be the case for multiple successive measurements obtained by the measurement equipment and for multiple successive debug outputs received by the debug tool. The measurements and debug outputs are thereby correlated in time so that particular side-channel measurements or sequences of side-channel measurements are known to be related to particular debug outputs or sequences of debug outputs. This facilitates determining which operations of the device under test potentially lead to side-channel measurements of a certain acceptable or unacceptable level.

Figure 6:
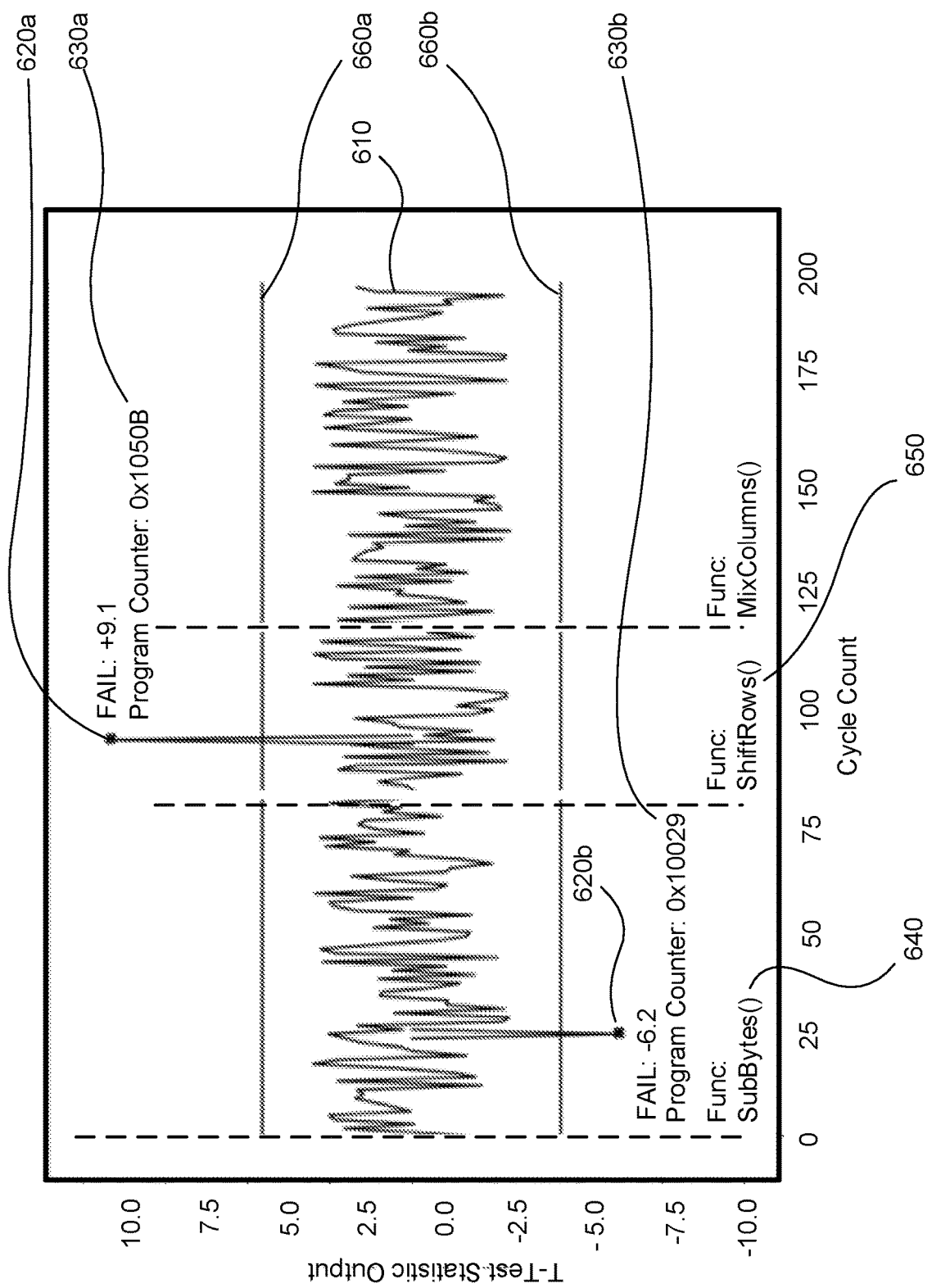
FIG. 6 illustrates a side channel analysis result with notations, according to an embodiment of the present invention.

This configuration allows the generation of more detailed information about the timing of side-channel failures. An example is given in FIG. 6, which shows a statistical report similar to that of FIG. 3. In this case the side-channel measurement output 610 shows that at certain times, e.g. corresponding to the time of peak 620a, the measurement output 610 exceeds an allowed upper threshold 660a. The specific code being executed in the program during the failure is reported by showing the state 630a of the program counter which occurs at the time of peak 620a. Another similar failure is shown at point 620b, where the measurement output 610 is below the allowed lower threshold 660b. The state 630b of the program counter which occurs at the time of point 620b is also displayed.

In addition, the location of functions being executed can be shown in this graph. For example the function SubBytes 640 is shown as being executed in the time interval between the first and second vertical dashed lines. Subsequently, another function ShiftRows 650 is shown as being executed during the time interval between the second and third vertical dashed vertical lines. The beginnings and ends of functions, and the states of program counters, are determined based on information obtained using the debug tool. This information may include time stamps indicating the times at which messages are received by the debug tool.

Figure 7:
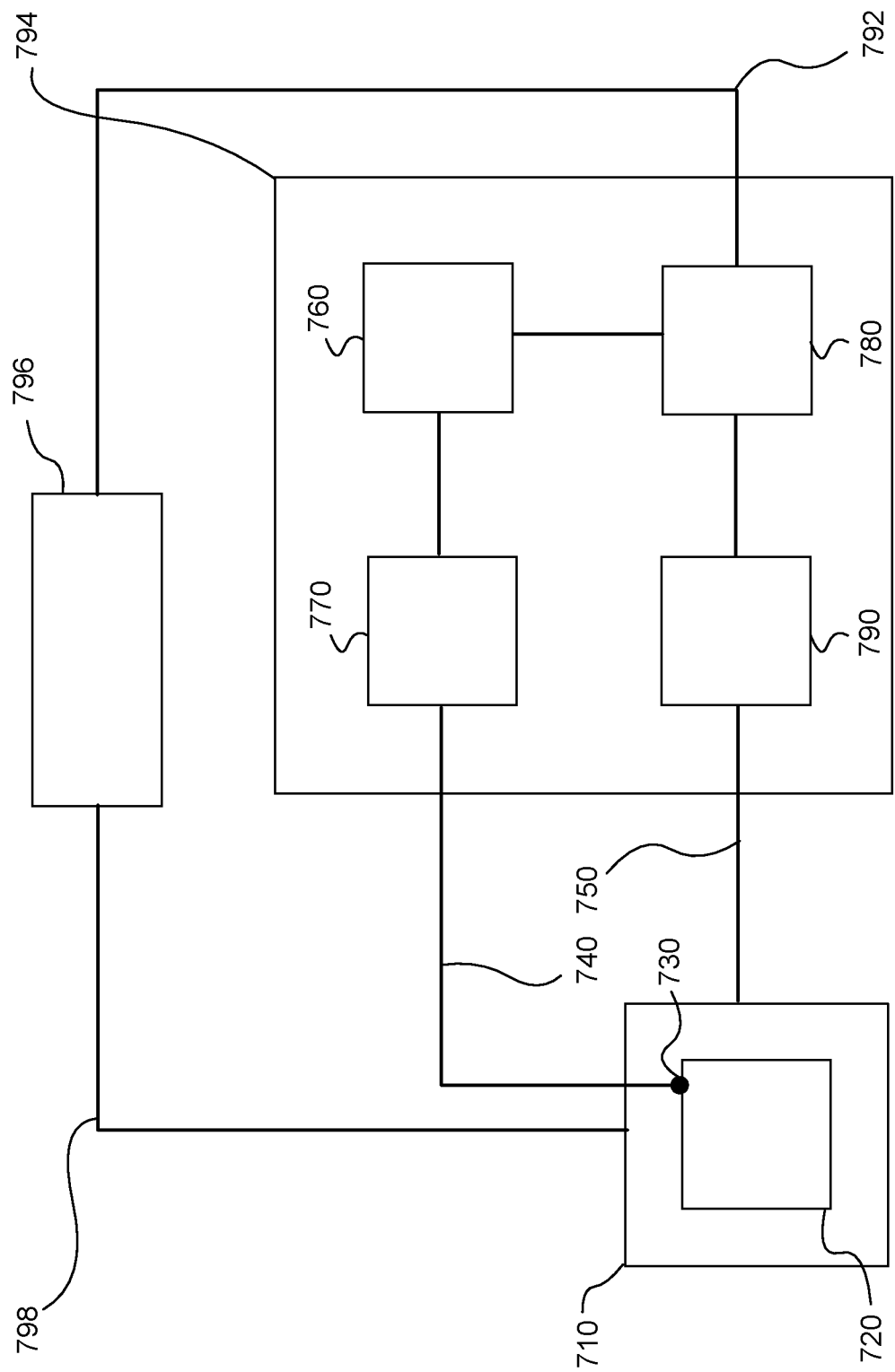
FIG. 7 illustrates a side-channel measurement and debug instrument integrated into a single apparatus, according to an embodiment of the present invention.

This apparatus has many potential embodiments. FIG. 5 illustrates an embodiment in which multiple separate instruments are operatively coupled together, for example using clock and data interconnections which may take the form of digital or analog transmission lines. In other embodiments, the instruments can be integrated into a single package, as illustrated in FIG. 7. In this embodiment, the target system 710 again contains a digital device 720. The probe 730 measures a side-channel leakage characteristic using test lead 740. In this case there is an integrated test equipment unit 794 that integrates the measurement equipment into one package. The test lead 740 signal is fed into an analog processing block 770, before being digitized by the analog-to-digital converter 760. The analog processing block 770 and analog-to-digital converter 760 may form the measurement equipment configured to obtain a sequence of measurements of a side-channel leakage characteristic. The analog-to-digital converter 760 is controlled by the control computer 780. This control computer 780 may be a field programmable logic device (FPGA), application specific integrated circuit (ASIC), microcontroller, or microprocessor for example. The control computer again controls the debug interface components 790 (debug tool), which interfaces using connection 750 to the debug components (e.g. debug port and formatter) on the digital device 720. The control computer 780 controls the clock and synchronization of the debug interface components 790 and the analog-to-digital converter 760. A common clock can drive processes at the debug interface and the analog-to-digital converter. The clock can drive the acquisition operations of the analog-to-digital converter. That is, the clock can drive the times at which analog inputs are latched into the converter and subsequently digitized. The control computer 780 provides a timing signal, based on the common clock, to both the debug interface components 790 and the analog-to-digital converter 760.

The integrated test equipment 794 may directly control the target system 710 during the test. Alternatively there may be a primary control computer 796 that controls the target device 710 using a connection 798. The primary control computer 796 may be a standard desktop computer or network-connected computer for example, which connects to the integrated test equipment 794 using an interface 792 such as USB, Ethernet, or other standard peripheral interfaces.

The type and configuration of the probe 730 along with test lead 740 will typically depend on the side channel characteristic being measured. If the characteristic is a side channel power attack, one embodiment of the probe is detailed in FIG. 8.

Figure 8:
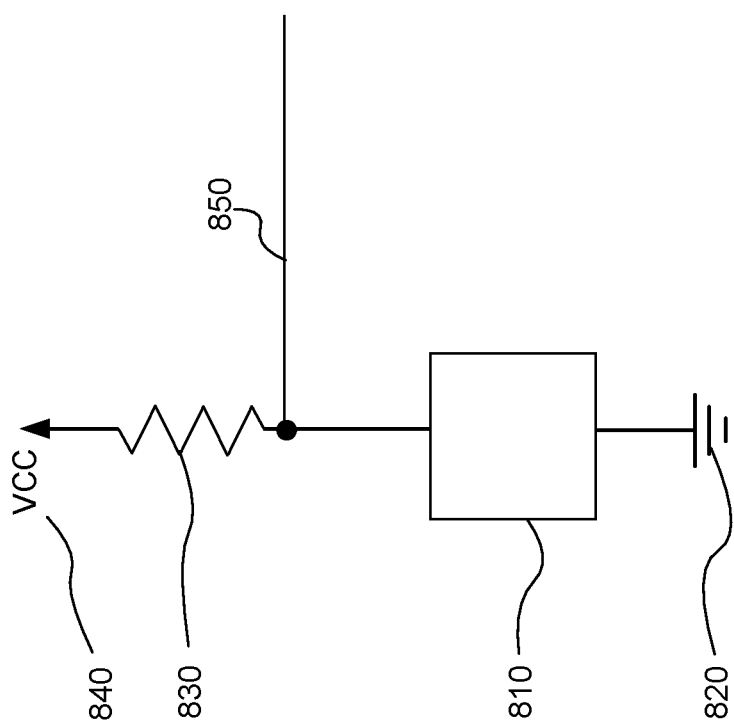
FIG. 8 illustrates a side channel measurement probe using a shunt resistor, according to an embodiment of the present invention.

FIG. 8 shows the digital device 810 which is executing the security code under evaluation. A typical side channel is the power measured using a shunt resistor 830 that is inserted into the power supply of the device. In this case the shunt resistor 830 is inserted between the positive voltage supply 840 and the digital device 810. The shunt resistor may alternatively be inserted into the path of the ground 820. The shunt resistor 830 has a changing voltage that depends on the current flowing through the shunt resistor 830, which is measured using a connection 850. The voltage across the resistor is proportional to the current drawn by the digital device, and is thus also proportional to the power drawn by the digital device. By monitoring the voltage over time, the power draw over time can be determined. Other alternative current monitoring means can be employed, as would be readily understood by a worker skilled in the art.

Figure 9:
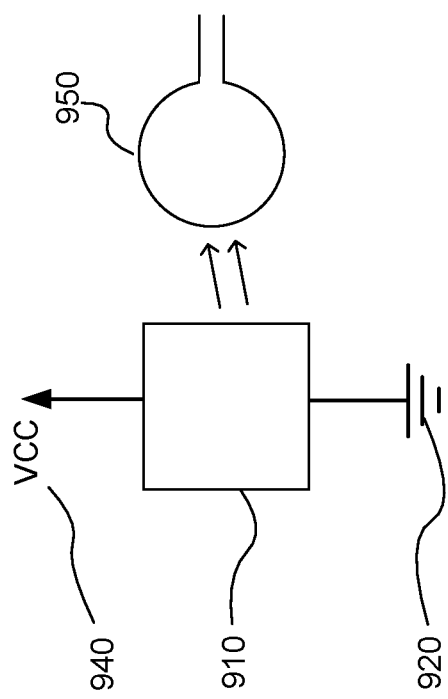
FIG. 9 illustrates a side channel measurement probe using a loop antenna, according to an embodiment of the present invention.

FIG. 9 shows an example of another measurement technique for side channel information. In this example digital device 910 is again executing the security code under evaluation. The digital device 910 is connected again to a positive power 940 and a ground 920. In this case there is no modification of the power supplied to digital device 910. Instead, a loop antenna 950 is placed near (less than 5 mm from) the device, typically being placed directly onto a surface of an integrated circuit (IC) for example. The loop antenna 950 outputs a voltage that is related to the magnetic field from the device. The device's magnetic field is known to carry similar information to a measurement using the shunt resistor from FIG. 8.

Figure 10:
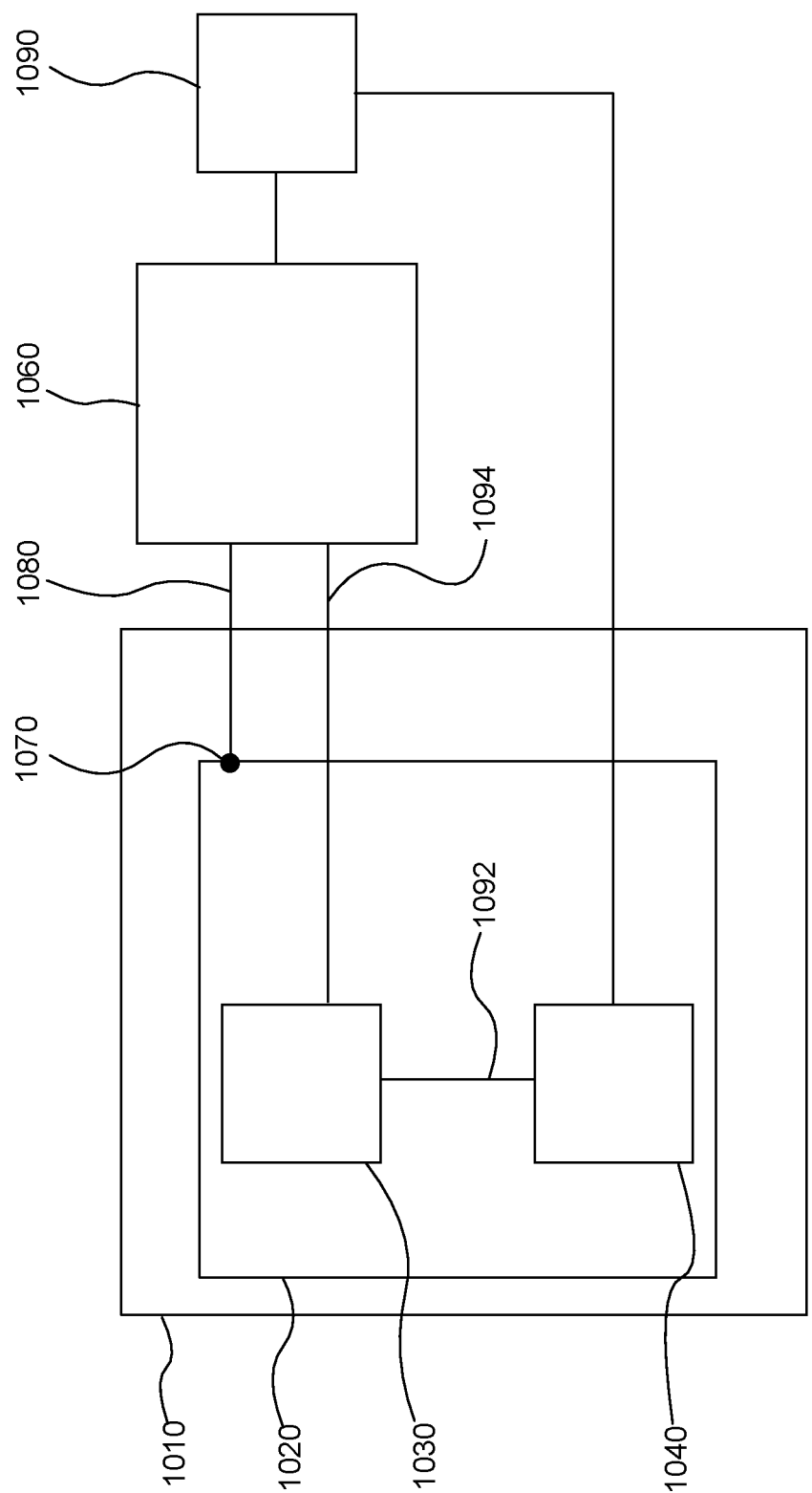
FIG. 10 illustrates a device under evaluation, and a debug tool provided using a field programmable gate array (FPGA), according to an embodiment of the present invention.

Parts of the test apparatus may be integrated into a single device. As another example embodiment, FIG. 10 shows an apparatus where the digital device under test is part of the test apparatus. When designing system on a chip devices, it is common to prototype the devices in a large field programmable gate array (FPGA). In this case the system 1010 is for example a development board, which has a FPGA 1020 used for the design of a digital device. The actual device under evaluation 1030 is part of the FPGA 1020 logic. In addition, the debug tool 1040 is integrated into the FPGA 1020. The debug tool 1040 can be provided as a functionality of the FPGA, and such functionality can also be referred to as "debug logic." This debug tool 1040 communicates with the control computer 1090, for example to provide extracts the debug information from the debug tool 1040 to the control computer 1040. In this case the debug logic connection 1092 is part of the FPGA 1020. Again a probe 1070 measures a side-channel leakage characteristic using test lead 1080 and measurement equipment 1060 (also referred to as measurement tool). A control computer 1090 is operatively coupled to the measurement equipment 1060 which provides information indicative of the side-channel measurements. The control computer is also operatively coupled to the debug tool 1040 which provides information indicative of the code execution state. In this case the connection 1094 can also carry clock information from the FPGA 1020. The clock on the FPGA may already be used by both the device under evaluation 1030 and the debug tool 1040. The control computer 1090 can provide a timing signal to both the debug tool 1040 and the measurement equipment 1060, potentially along with other components of the system. The timing signal can in some embodiments be based on or synchronized with the clock information from the FPGA, carried on the connection 1094.

In various embodiments, the measurement equipment can be triggered to acquire a measurement upon receipt of a message at the debug tool, or upon observing a predetermined pattern the debug data. To this end, the controller can monitor the debug data as provided by the debug tool for the occurrence of a predetermined pattern, such as a certain message or a combination of messages. When the predetermined pattern is observed, the controller can transmit a trigger to the measurement equipment which causes the measurement equipment to acquire a measurement. The predetermined pattern can be a single particular debug output, a single debug output belonging to a list or class or multiple debug outputs, a series of particular debug outputs, a series of debug outputs belonging to a list of class of multiple debug outputs, or the like. In one embodiment, the predetermined pattern is any debug output, such that receipt of any such debug output causes transmission of the trigger. In other embodiments, the predetermined pattern specifies particular debug outputs, types of debug outputs, or sequences of debug outputs, in order that specific observed types of debug activity cause transmission of the trigger in order to capture probe measurements corresponding to particular types of events.

In some embodiments, activity on the communication lines input to the debug tool can trigger the measurement equipment to obtain a measurement sample from the probe, e.g. by latching in an input at an analog-to-digital converter input thereof. This may be performed in addition to the obtaining of other measurement samples by the measurement equipment. A triggering circuit which is configured to monitor the communication lines from the debug port and immediately initiate such an acquisition upon the communication lines indicating a new message from the debug port can be provided. As a simple example, the triggering circuit can monitor for any change on the communication lines from the debug port by using a simple circuit that generates a trigger upon detecting any such change. The trigger can be provided directly to the measurement equipment and used thereby to acquire a current measurement sample from the associated probe. The triggering circuit can be provided as part of the controller, for example as hardware or software (triggering routines), or the triggering circuit can be provided as part of the debug tool. Hardware triggering circuits within the debug tool may provide for more timely triggering, while triggering routines implemented by the controller may potentially be slower but more sophisticated.

Notably, in various embodiments of the invention, multiple measurement of a sequence of measurements (of a side channel leakage characteristic) are correlated in time with multiple debug outputs from a sequence of debug outputs. The correlation in time can be based on a common timing signal which drives acquisition of both the sequence of measurements and the sequence of debug outputs. The controller can provide both information indicative of the sequence of measurements of side channel leakage as first time series data, and information indicative of the sequence of debug outputs as second time series data. The correlation in time can include providing both the first time series data and the second time series data as data points indexed using a common time reference.

Embodiments of the present invention can provide, as output, information in tabular, graphical, textual, or other format. The information can be output to a graphical display, a user or machine-readable digital file, or the like. The information includes information derived from received debug outputs, such as indications of instructions performed over time by the digital device under test. The information includes information derived from measurements made by a measurement tool configured to measure side-channel leakage characteristics of the device under test. This information can be presented in the form of raw or processed measurements. For example, the measurements can be processed using a statistical analysis processing routine. The information derived from the debug outputs and the information derived from the measurements is correlated in time. This correlation may be due at least in part to the actions of the debug tool and the measurement equipment being synchronized in time. The correlating itself may include partially or fully synchronizing the outputs of the measurement tool with the outputs of the debug tool, or at least providing a common time base driving generation of such outputs.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus comprising:
   measurement equipment configured to obtain a sequence of physical measurements of a side-channel leakage characteristic of a self-contained digital device under test while the digital device under test is executing instructions;
   a debug tool configured to obtain a sequence of debug outputs from the digital device under test via a hardware debug interface of the digital device under test, wherein the debug outputs are indicative of the instructions executed by the digital device under test; and
   a controller operatively and physically coupled to the measurement equipment and the debug tool such that the measurement equipment, the debug tool and the controller are integrated together into a single instrument and the controller configured to correlate, in time, at least one measurement in the sequence of measurements with at least one debug output in the sequence of debug outputs, wherein the controller is configured to control the measurement equipment and the debug tool.

2. The apparatus of claim 1, wherein the controller is configured to generate and provide a common timing signal to both the measurement equipment and the debug tool, wherein the debug tool is configured to time stamp plural debug outputs belonging to the sequence of debug outputs based on the common timing signal, and wherein the measurement equipment is configured to acquire plural measurements of the sequence of measurements based on the common timing signal.

3. The apparatus of claim 1, wherein correlating the at least one measurement with the at least one debug output comprises processing the sequence of measurements into first time series data, processing the sequence of debug outputs into second time series data, and providing both the first time series data and the second time series data as data points indexed using a common time reference.

4. The apparatus of claim 3, wherein the controller is further configured to generate and provide a common timing signal to both the measurement equipment and the debug tool, wherein the measurement equipment and the debug tool are configured to operate based on the common timing signal, and wherein the common time reference is synchronized with the common timing signal.

5. The apparatus of claim 1, wherein the side-channel leakage characteristic comprises a measurement of power consumed by the digital device under test.

6. The apparatus of claim 1, wherein the side-channel leakage characteristic comprises a measurement of electromagnetic emissions of the digital device under test.

7. The apparatus of claim 1, wherein the side-channel leakage characteristic comprises a measurement of execution time of an algorithm being executed by the digital device under test.

8. The apparatus of claim 1, wherein the controller is further configured to generate a trigger signal upon observation of a predetermined pattern in the sequence of debug outputs, wherein the sequence of debug outputs indicates one or more states in the digital device under test, the trigger signal transmitted to the measurement equipment, the measurement equipment configured to obtain a measurement in response to receipt of the trigger signal.

9. A method for analyzing side-channel related security vulnerabilities, the method comprising:
   obtaining, by measurement equipment, a sequence of physical measurements of a side-channel leakage characteristic of a self-contained digital device under test while the digital device under test is executing instructions;
   obtaining, by a debug tool, a sequence of debug outputs from the digital device under test via a hardware debug interface of the digital device under test, wherein the debug outputs are indicative of the instructions executed by the digital device under test; and
   controlling, by a controller physically coupled to the measurement equipment and the debug tool such that the measurement equipment, the debug tool and the controller are integrated together into a single instrument, operation of the measurement equipment and the debug tool; and
   correlating, in time, by the controller, at least one measurement in the sequence of measurements with at least one debug output in the sequence of debug outputs.

10. The method of claim 9, wherein said controlling comprises generating and providing a common timing signal to both the measurement equipment and the debug tool, wherein obtaining the sequence of debug outputs comprises time stamping plural debug outputs belonging to the sequence of debug outputs based on the common timing signal, and wherein obtaining the sequence of measurements comprises acquiring plural measurements of the sequence of measurements based on the common timing signal.

11. The method of claim 9, wherein correlating the at least one measurement with the at least one debug output comprises processing the sequence of measurements into first time series data, processing the sequence of debug outputs into second time series data, and providing both the first time series data and the second time series data as data points indexed using a common time reference.

12. The method of claim 11, further comprising generating and providing a common timing signal to both the measurement equipment and the debug tool, wherein the measurement equipment and the debug tool operate based on the common timing signal, and wherein the common time reference is synchronized with the common timing signal.

13. The method of claim 9, wherein the side-channel leakage characteristic comprises a measurement of power consumed by the digital device under test.

14. The method of claim 9, wherein the side-channel leakage characteristic comprises a measurement of electromagnetic emissions of the digital device under test.

15. The method of claim 9, wherein the side-channel leakage characteristic comprises a measurement of execution time of an algorithm being executed by the digital device under test.

16. The method of claim 9, further comprising, by the controller, generating a trigger signal upon observation of a predetermined pattern in the sequence of debug outputs, wherein the sequence of debug outputs indicates one or more states in the digital device under test, transmitting the trigger to the measurement equipment, and obtaining, by the measurement equipment, a measurement in response to receipt of the trigger signal.

17. A method for analyzing side-channel related security vulnerabilities, the method comprising:
- obtaining, by a debug tool, a sequence of debug outputs from a self-contained digital device under test, via a hardware debug interface of the digital device under test, wherein the debug outputs are indicative of instructions executed by the digital device under test;
- monitoring, by a controller physically coupled to the debug tool such that the measurement equipment, the debug tool and the controller are integrated together into a single instrument or by the debug tool, for a predetermined pattern in the sequence of debug outputs from the digital device under test;
- in response to detecting the predetermined pattern, triggering, by the controller or by the debug tool, measurement equipment to obtain one or more physical measurements of a side-channel leakage characteristic of the digital device under test while the digital device under test is executing the instructions.

18. The method of claim 17, further comprising correlating, in time, at least one measurement in the one or more measurements with at least one debug output in the sequence of debug outputs.

19. The apparatus of claim 1, wherein the measurement equipment comprises an oscilloscope.

\* \* \* \* \*